Sept. 19, 1944.                S. D. DUNLAP                2,358,565
                                  TONGS
                            Filed July 22, 1943
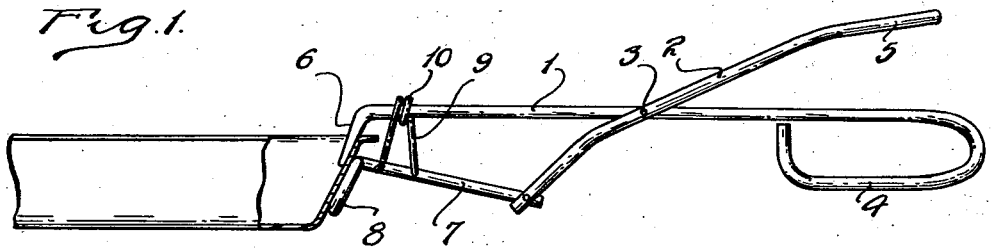
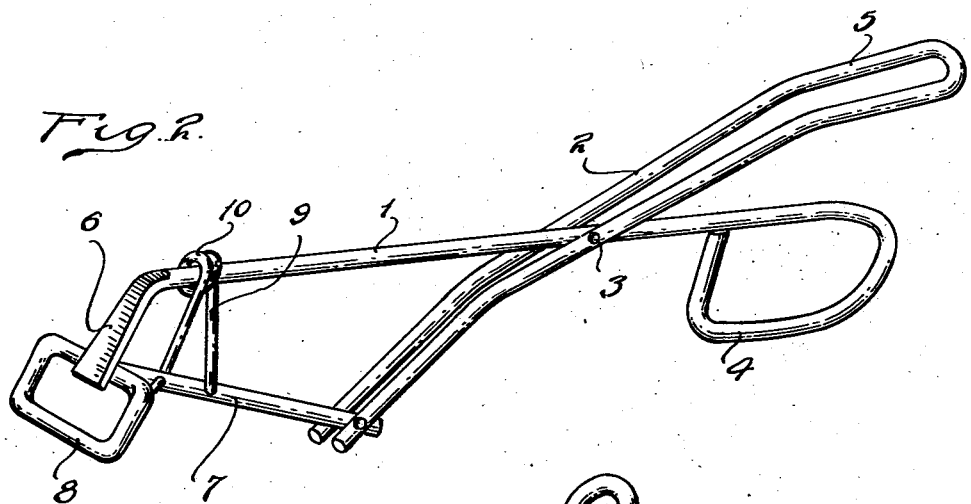
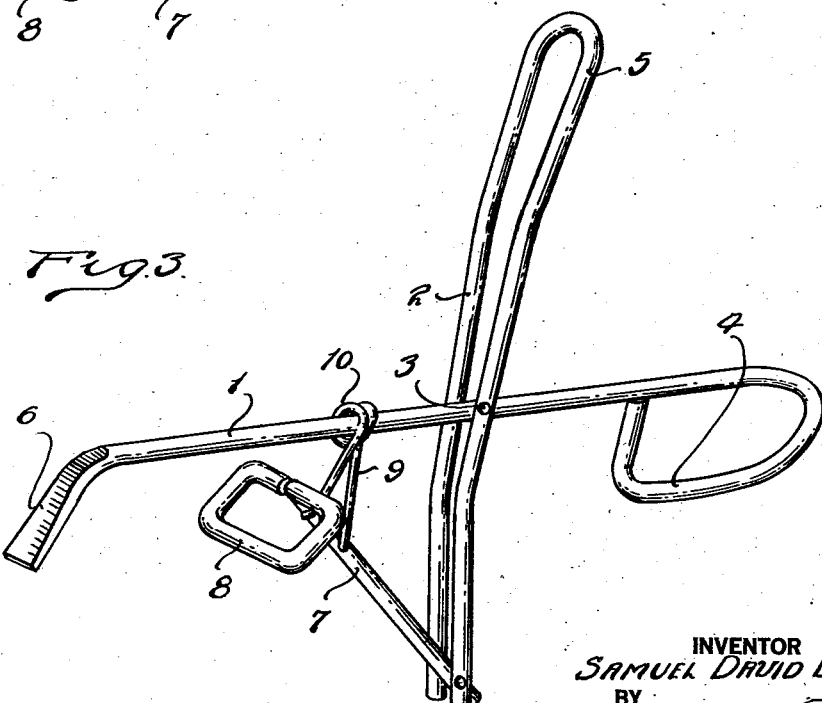
INVENTOR
SAMUEL DAVID DUNLAP.
BY
ATTORNEY Patented Sept. 19, 1944

2,358,565

UNITED STATES PATENT OFFICE 2,358,565

TONGS

Samuel David Dunlap, Bowling Green, Ohio

Application July 22, 1943, Serial No. 495,971

6 Claims. (Cl. 294—34)

This invention relates to tongs for use in the manipulation and handling of articles, more particularly kitchen utensils which, due to being used where they become heated, are difficult for the housewife to handle.

The features of the invention are embodied in the arrangement of the parts of the tongs providing a stationary and a movable element for gripping the article, one of which is separately useful in moving the article.

Structurally, the invention involves two main pivoted parts or arms and an element having a clamping member pivoted at one end to one of the arms and supported at its free end by an element slidable on the other arm.

These and other objects and features of the invention are hereinafter more fully described and claimed and the preferred form of construction of a tongs embodying my invention is shown in the accompanying drawing in which—

Fig. 1 is an elevation showing the tongs in the relationship of parts in clamping an article preparatory to lifting the same.

Fig. 2 is a perspective view of the device showing the clamping elements in the relationship assumed when gripping an article.

Fig. 3 is a perspective view showing the clamping elements withdrawn from the clamping relationship.

In its preferred form, the tongs comprises an arm 1 and an arm 2 pivoted thereto at a point between the ends of the two prongs. Both arms are preferably formed of a wire or rod-like material as will be understood from Fig. 2 and preferably the arm 2 is formed in a loop with parallel leg portions. A pin 3 passes through both the legs of the member 2 and the arm 1 which is introduced therebetween.

The arm 1 has a return bent end portion 4 forming a grip for the fingers of the hand of the user while the end 5 of the prong 2 is in the form of a loop which fits the palm of the hand and prevents turning of the device in the user's hand. The prong 1 terminates in an angularly disposed end portion 6 which is preferably flattened to increase the surface contact with an article to be manipulated. There is also a third arm 7 pivoted at one end between the ends of the two legs of the member 2. At its opposite end, the member 7 is bent upon itself to form a gripping element or prong 8 (here shown as being of rectangular form). When the parts are in the relationship shown in Figs. 1 and 2, the gripping elements 6 and 8 are substantially parallel to properly engage the article. The width of the prong 8 is materially greater than the width of the prong 6 which, when grasping the article, is centrally disposed in relation to the prong 8 and by engagement thereof with the article supports the same from turning.

The pivoted arm 7 carrying the clamping prong 8 requires to be supported on the member 1 whereby it is guided in the movement toward and from the prong 6 of the arm 1 and, when the two arms are separated as shown in Fig. 3, the pivoted arm 7 and its end portion 8 assume the position indicated in Fig. 3. It will be noted that in this position of the arms the clamping prong 8 is in position permitting the prong 6 to be introduced over the rim of a dish when in an oven for instance, and by which it may be drawn by the user toward the front of the oven, whereupon, by bringing the prongs together as shown in Fig. 1, the article may be lifted and carried by maintaining the clamping pressure between the prongs 6 and 8 in the manner shown in Fig. 1.

The device is of simple form and construction and inexpensive to manufacture as it may be made of standard wire or rod stock shaped after the manner shown herein. The provision of the two legs of the arm 2 between which the arm 1 passes and is secured thereto by the pivot pin 3 provides a construction supporting the pin 3 on opposite sides of the arm 1 thus preventing tilting or side movement of the member 2 relative to the arm 1. The user may readily manipulate the parts by means of the thumb to place the prongs in the relationship shown in Fig. 3 or, by the thumb or finger, to turn it to position shown in Fig. 2 in which the end loop portion 5 of the arm 2 lies in the palm of the hand while the fingers of the hand are introduced in the loop 4 of the arm 1. Thus, the device is very readily operable by one hand of the user to either open the prongs to release an article as in the position of the parts shown in Fig. 3 or to clamp an article under pressure applied to the handle ends of the two arms when in the position shown in Figs. 1 and 2. The forming of the member 2 with the two legs terminating in parallel relation at one end and forming a loop at the other permits the arm 1 and the arm 7 to be introduced between the two leg portions which, as above stated, prevents any side twist on the pins securing the parts together.

The arm 7 at its outer end is slidably supported on the arm 1 by a wire 9 which is formed with a double loop indicated at 10 about the body of the element 1, the eye of the loop being sufficiently larger than the diameter of the member 1 to permit its free sliding movement thereon.

By this form of loop there is only a single wire in engagement with the member 1 on the underside thereof or side toward the arm 7. This allows the loop to slide on the arm 1 to assume the position shown in Fig. 3 without binding and, by having the two ends of the wire 9 attached in spaced relation to the member 7, the loop end 10 is made to traverse the body of the arm 1 and to change in angular relation thereto and thus is more satisfactory in use than a single loop with a single point of attachment to the arm 7.

It is believed evident from the foregoing description that the device is very simple and inexpensive in construction, that the various objects and features of the invention are attained by the structure described and that various modifications may be made in the structure of the parts without departing from the spirit and scope of the invention as set forth in the appended claims.

Having thus fully described my invention, its utility and mode of operation, what I claim and desire to secure by Letters Patent of the United States is:

1. A tongs for the purpose described, comprising two main arms pivoted together intermediate the respective ends of each thereof, one of said arms having a prong at one end lying at an angle to the body thereof and having a loop providing a hand hold at the opposite end, the other arm being formed with parallel legs between which the body of the first arm is pivotally secured and the handle end thereof forming a loop to lie within the palm of the hand of the user, a short arm pivoted at one end between the legs of the second arm adjacent the ends thereof and having a prong at its opposite end for cooperative relation with the angularly disposed prong of the first said arm, a support for said pivoted arm connected therewith adjacent the free end thereof and having a loop through which the first arm extends of a diameter greater than the diameter of the first said arm permitting the loop to slide thereon in moving the handle ends of the arms toward or from each other to thereby cause the prongs to engage an article positioned therebetween or to release the same.

2. A tongs for the purpose described, comprising two main arms pivoted together intermediate the respective ends of each thereof, one of said arms having a prong at one end lying at an angle to the body thereof and having a loop providing a hand hold at the opposite end, the other arm being formed with parallel legs between which the body of the first arm is pivotally secured and the handle end thereof forming a loop to lie within the palm of the hand of the user, a short arm pivoted at one end between the legs of the second arm adjacent the ends thereof and having a prong at its opposite end for cooperative relation with the angularly disposed prong of the first said arm, a support for said pivoted arm connected therewith adjacent the free end thereof and having a loop through which the first arm extends of a diameter greater than the diameter of the first said arm permitting the loop to slide thereon in moving the handle ends of the arms toward or from each other to thereby cause the prongs to engage an article positioned therebetween or to release the same, the prong of the said short arm being of greater width than the prong of the first arm.

3. A tongs for the purpose described, comprising two arms pivoted together intermediate the respective ends thereof, one of said arms being formed of a single sheet of rod stock terminating at one end in a prong at an angle to the body and at the other end shaped to form a loop providing a hand hold, the other of said arms being composite in character and comprising a main body portion formed of rod stock bent upon itself to provide parallel legs providing a loop portion in opposed relation with the hand hold of the first arm of a width to seat in the palm of the user and prevent tilting in the hand and an auxiliary arm formed of rod stock having one end positioned between the legs of said named arm adjacent the ends thereof and a prong portion at the other end which when brought to clamping position lies in substantially parallel relation with the prong of the first arm and engaging an article therebetween at points respectively each side of the terminal prong of the first arm, and a supporting means for the free end of the auxiliary arm arranged for sliding relation on the body of the first arm.

4. A tongs for the purpose described, comprising two arms each formed of rod stock and pivoted together intermediate their ends to be operated in the manner of a scissors, one of said arms having a terminal prong portion opposite the handle and the other of said arms having an auxiliary arm pivoted at one end to an end of said other arm and having an article contacting portion at the opposite end of rectangular form and greater width than the prong of the first arm and functioning with the prong of the first arm when grasping an article therebetween, a link fixed to the auxiliary arm adjacent the prong end thereof having an eye of greater diameter than and slidable on the body of the first arm when the handle ends are moved together, the arrangement providing that the prong ends of the first arm and auxiliary arm assume a wedging relation when the handle ends of the first named arms are brought together.

5. A tongs for the purpose described comprising two arms in pivoted relation intermediate their respective end portions, one of said arms being unitary in structure and the other of said arms having a main part and an auxiliary part pivoted at one end to the end of the main part, the length of the arms from the pivot point therebetween toward the handle end being of substantially the same length, and the arm having said auxiliary part pivoted thereto at a comparatively short distance from the pivot point between the two said arms, a link comprising a wire bent upon itself intermediate its ends to provide an eye slidable on the free end of the first of said arms and having its ends attached to the auxiliary arm adjacent its prong end and slidably supporting the free end of the auxiliary arm on the body of the first arm, said first arm and said auxiliary arm at the respective free ends having cooperative article gripping portions.

6. A tongs for the purpose described comprising two arms in pivoted relation intermediate their respective end portions, one of said arms being unitary in structure and the other of said arms having a main part and an auxiliary part pivoted at one end to the end of the main part, the length of the arms from the pivot point therebetween toward the handle end being of substantially the same length, the arm having said auxiliary part pivoted thereto at a comparatively short distance from the pivot point between the two said arms, and a link fixed to the free end of the auxiliary part and having an eye of greater diameter than and slidable on the body of the said first arm to permit said auxiliary arm to change in angular relationship as the two arms are brought together, said first arm having an article gripping portion at its free end and said auxiliary arm having a cooperative article gripping portion at its free end formed by bending the said end upon itself to form an article gripping portion of greater width than that of the first arm and brought to wedging relationship with the gripping portion of the first arm to thereby grip an article therebetween as the first named arms are brought together.

SAMUEL DAVID DUNLAP.